United States Patent [19]

Maycock et al.

[11] Patent Number: 4,613,030
[45] Date of Patent: Sep. 23, 1986

[54] FRICTION CLUTCH DRIVEN PLATE

[75] Inventors: Ian C. Maycock; Robert J. Ball, both of Leamington Spa; Denzil J. W. Symonds, Warwick, all of United Kingdom

[73] Assignee: Automotive Products plc, Leamington Spa, England

[21] Appl. No.: 617,709

[22] Filed: Jun. 6, 1984

[30] Foreign Application Priority Data

Jun. 11, 1983 [GB] United Kingdom ............... 8316095

[51] Int. Cl.⁴ ............................................. F16D 13/68
[52] U.S. Cl. .................................. 192/106.2; 464/77
[58] Field of Search ............... 192/106.1, 106.2, 70.17; 464/66, 68, 69, 77

[56] References Cited

U.S. PATENT DOCUMENTS

| 1,495,207 | 5/1924 | Rybeck | 464/77 |
| 1,740,656 | 12/1929 | Koch | 464/77 |
| 2,114,247 | 4/1938 | Davis | 192/70.17 |
| 4,105,102 | 8/1978 | Nels | 192/106.1 |
| 4,210,234 | 7/1980 | Jones | 192/106.1 |
| 4,239,097 | 12/1980 | Greacew et al. | 192/106.2 |

FOREIGN PATENT DOCUMENTS

| 2529982 | 1/1984 | France . |
| 1073010 | 6/1967 | United Kingdom . |
| 1084240 | 9/1967 | United Kingdom . |
| 1562071 | 3/1980 | United Kingdom . |
| 2084698 | 4/1982 | United Kingdom . |
| 2087043 | 5/1982 | United Kingdom . |
| 2123925 | 2/1984 | United Kingdom . |

OTHER PUBLICATIONS

Patents Abstracts of Japan, vol. 7, No. 223 (M-247) (1368) Oct. 4, 1983.

Primary Examiner—George H. Krizmanich
Attorney, Agent, or Firm—Solon B. Kemon

[57] ABSTRACT

A friction clutch driven plate comprises a hub with a small integral flange and an outer flange portion coupled to the hub through a lost motion connection associated with interengaging teeth. In addition to main torsional damping springing associated with springs in windows in the outer flange portion and side plates of a friction facing carrier, auxiliary circumferentially acting springing acts between the hub and the outer flange portion. The auxiliary springing comprises two springs, one to each side of the hub flange. The springs are circumferentially extending spring arms engaged in the hub and outer flange portion and together are much weaker than the main springs taken together and provide damping to prevent idle rattle while the main springs provide friction damping during transmission of torque through the driven plate.

8 Claims, 4 Drawing Figures

FRICTION CLUTCH DRIVEN PLATE

BACKGROUND OF THE INVENTION

This invention relates to a friction clutch driven plates and particularly, but not exclusively, to driven plates which are utilised in the friction clutches of automobiles.

A problem associated with some automobiles is that during the periods when the transmission drive is under no load, rotary oscillations occur in the gearbox producing a phenomenon known as idle-rattle.

In order to damp out the vibrations which genenrate idle-rattle it is known to utilise a friction clutch driven plate in which the torque load through the driven plate passes through two sets of damping springs arranged in series with each other. Very light loads applied to the driven plate are taken through soft auxiliary vibration damping springing. When the limited angular movement controlled by the auxiliary damping springing has been taken up, normal drive load passes through a set of main torsion damping springs. In this way, very soft springing is provided over a limited range of movement for very light loads and this arrangement tends to prevent idle-rattle. Such a driven plate is known from French Patent Publication No. 1501465.

It is often important for a friction clutch driven plate to be compact in order to enable it to fit within a space available in an existing design of drive line or to assist in maintaining the combination of engine, clutch and gearbox as short as possible in a completely new design.

It is also known, for example from UK published patent application 2 087 043 A to use a circumferentially extending spring arm as the spring medium for the auxiliary friction damping. This kind of arrangement can be compact in an axial direction. However it is necessary for the auxiliary springing to be sufficiently powerful to overcome friction inherent in the clutch driven plate so that the auxiliary springing operates effectively. The spring force available from a circumferentially acting spring, which must remain effective for the life of the clutch driven plate, may be insufficient for practical requirements.

An object of the present invention is to provide a compact design of clutch driven plate having main torsion damping springing and effective auxiliary torsion damping springing.

SUMMARY OF THE INVENTION

According to a first aspect of the invention there is provided a friction clutch driven plate comprising a hub and a friction facing carrier arranged co-axially with respect to each other, main torsional vibration damping springing acting through a lost motion connection in a driving connection between the hub and carrier comprising circumferentially directed compression springs arranged in windows of a central annular member and in windows in a pair of further annular members secured together and spaced one to each side of the central member and auxiliary torsional vibration damping springing arranged in the driving connection between the hub and carrier wherein the auxiliary springing comprises two circumferentially extending spring arms, each positioned radially inward of an annular friction member one to each side of the central annular member, arranged to be loaded in bending with relative movement between the hub and the carrier during lost motion travel associated with the lost motion connection of the main springing.

According to a second aspect of the present invention there is provided a friction clutch driven plate comprising a hub, a flange extending radially out from the hub with at least the outer portion of the flange separate from and capable of limited angular rotation with respect to the hub so as to constitute an intermediate drive means, a friction facing carrier including two side plates, one to each side of the flange and coupled to the intermediate drive means by circumferentially acting main torsion damping springing, auxiliary circumferentially acting torsion damping springing, weaker than the main drive springing, acting between the hub and the intermediate drive means, wherein the auxiliary springing comprises two circumferentially extending spring arms, one to each side of the flange, each positioned radially inward of an annular friction member arranged to be loaded in bending with relative movement between the hub and intermediate drive means.

The provision of two circumferentially extending spring arms, one to each side of the flange, provides an effective degree of springing whilst a compact structure can be maintained.

One end portion of each spring arm may engage with the hub and the other end of each spring arm may engage with the intermediate drive means.

Alternatively, each end of each spring arm may have an abutment for the hub and an abutment for the intermediate drive means, arranged so that for rotation in one direction the hub lifts the intermediate drive means abutment off its seat at one end of the spring arm, and the intermediate drive means lifts the hub abutment off its seat at the other end of the spring arm and vice versa for rotation in the opposite direction.

The spring arms may be formed of wire or of sheet material. In the latter case, the width of each arm may vary along its length in dependence on the variation in bending moment along the arm. A spring arm of sheet material may be constrained axially of the driven plate to prevent buckling of the spring arm.

Another problem with the torsional vibration dampers incorporated in friction clutch driven plates and known from French patent publication No. 1501465 and UK published patent application No. 2087043A is that as the torque loads on the system alternate in direction with the vibration, the direction in which the spring arm is loaded also alternates, resulting in a cyclic stress pattern which encourages fatigue failures.

The present invention is also concerned with a spring loading arrangement which allows the spring to be stressed in the same sense, regardless of the direction of relative movement between the two components between which the spring operates.

BRIEF DESCRIPTION OF THE DRAWINGS

Embodiments of the invention will be described with reference to the accompanying drawings in which:

FIG. 4 is a section on line IV—IV of FIG. 3.

DESCRIPTION OF A PREFERRED EMBODIMENT

Figure 1:
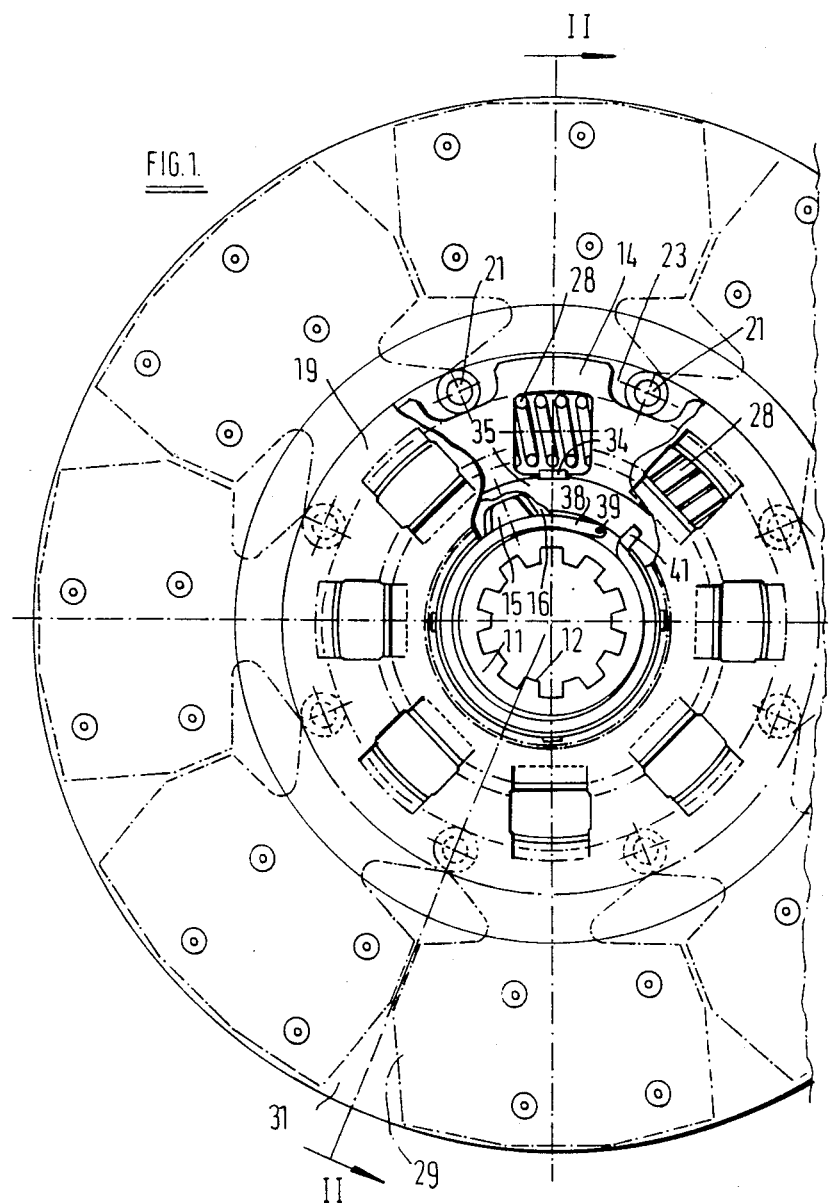
FIG. 1 is an end elevation, with parts removed to show details, of a friction clutch driven plate according to the invention.
Figure 2:
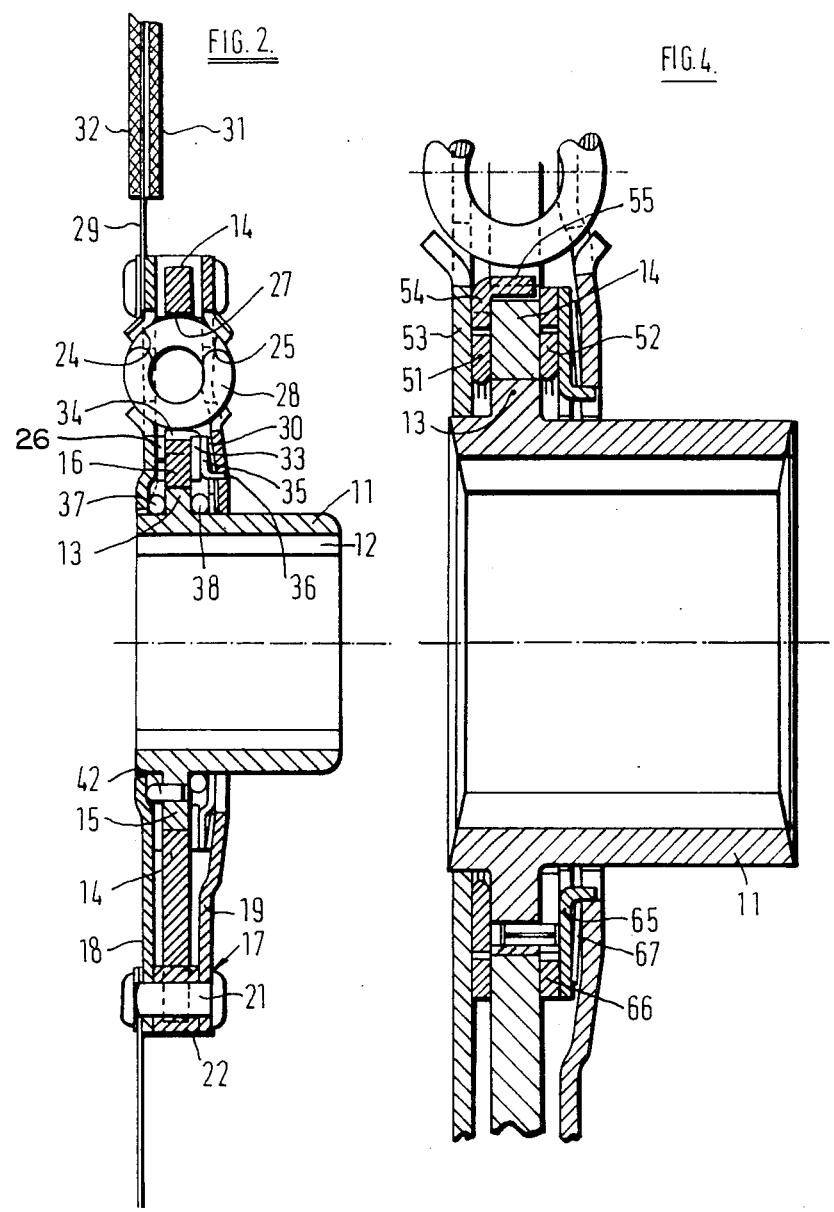
FIG. 2 is a section on line II—II of FIG. 1.

In the embodiment shown in FIGS. 1 and 2 the friction clutch driven plate comprises a hub 11 having splines 12 for driving a gearbox input shaft. The hub has a small integral flange 13 which is effectively extended outwardly by an outer flange portion 14, constituting an intermediate drive means. Intermediate drive means 14 is coupled to the hub 11 by interengaging teeth 15 and 16 which provide a lost motion connection allowing relative angular rotation.

A friction facing carrier 17 incorporates two side plates 8 and 19, one to each side of the flange 13 and intermediate drive means 14. The side plates are spaced apart from each other and joined together by rivets 21 and spacers 22. As seen in FIG. 1, the rivets and spacers lie within axially elongated openings 23 in the intermediate drive means 14 in such a way as to allow limited angular rotation between the intermediate drive means and the friction facing carrier. The side plates 18 and 19 are provided with mutually aligned windows 24 and 25 and the intermediate drive means 14 has corresponding windows 27. Circumferentially extending compression coil springs 28 are arranged in these windows in such a way as to provide circumferentially acting main torsion damping springing. Springs 28 control the load required to deflect the intermediate drive means 14 circumferentially with respect to the friction facing carrier 17 within limits set by the stop rivets 21 in openings 23. The intermediate drive means 14 constitutes a central annular member and side plates 18 and 19 constitute a pair of further annular members for the main torsional vibration damping springs 28.

The friction facing carrier 17 also incorporates a ring of outwardly extending spring segments 29 carrying friction facings 31 and 32.

Friction damping means are provided for controlling friction in the connection between the intermediate guide means 14 and the friction facing carrier 17. The friction damping means comprises an abutment ring constituting a first annular friction member 26 arranged between side plate 18 and intermediate drive means 14. The friction damping means also comprises a metal friction damping ring 33 constituting a second annular friction member engaged by drive dogs 34 in window 27 of the intermediate drive means and a metal thrust washer 35 engaged by dogs 36 in the friction facing carrier 19. Face to face pressure to establish the required friction is provided by axial biassing means constituted by a belville spring 30. The thickness of the intermediate drive means (in an axial direction) should be slightly greater than the corresponding thickness of flange 13 so that friction damping ring 33 does not engage against the flange 13. It can be seen that each spring arm 37 and 38 is positioned radially inward of one of said annular friction members.

Auxiliary circumferentially acting torsion damping springing is also provided between the hub 11 and intermediate drive means 14. This springing is constituted by two circumferentially extending spring arms 37 and 38 arranged one to each side of the flange 13 adjacent the hub 11. These spring arms are bent from round spring steel wire to an almost complete circle surrounding the hub and each has two bent over end portions for engagement respectively with the hub 11 and the intermediate drive means 14. Thus, for the spring 38, one end 39 is bent over to extend axially through a drilling in the hub flange 13 while the other end portion 41 is bent radially outward to engage with friction damping ring 33 which is in turn coupled to the intermediate drive means. Spring 37 has an end portion 42 corresponding to end portion 39 and an outwardly extending end portion (not shown) corresponding to end portion 41.

Springs 37 and 38 are arranged to act in opposition to each other so that one is being expanded in one direction of relative travel while the other is being contracted. For this reason, any preloading in the springs is cancelled out provided the preloading is similar for both springs. This is a particularly attractive feature because it avoids the requirement for accurately bent wire springs which would otherwise be necessary to hold the hub and intermediate drive means in a central position of their range of relative angular movement.

In use, when the friction clutch driven plate is installed in a friction clutch of a vehicle, the light springing of the springs 37 and 38 allows angular movement between the hub and the friction facing carrier with very little load and this freedom of movement tends to damp out idle rattle which could otherwise occur when the drive through the clutch is unloaded. When torque is being transmitted through the clutch, all the available angular movement between the hub and the intermediate drive means is taken up in one direction and damping of vibrations which occur during torque transmission is effected by the main torsion damping springing constituted by springs 28. During this phase of operation the friction damping associated with friction damping ring 33 also comes into operation.

Figure 3:
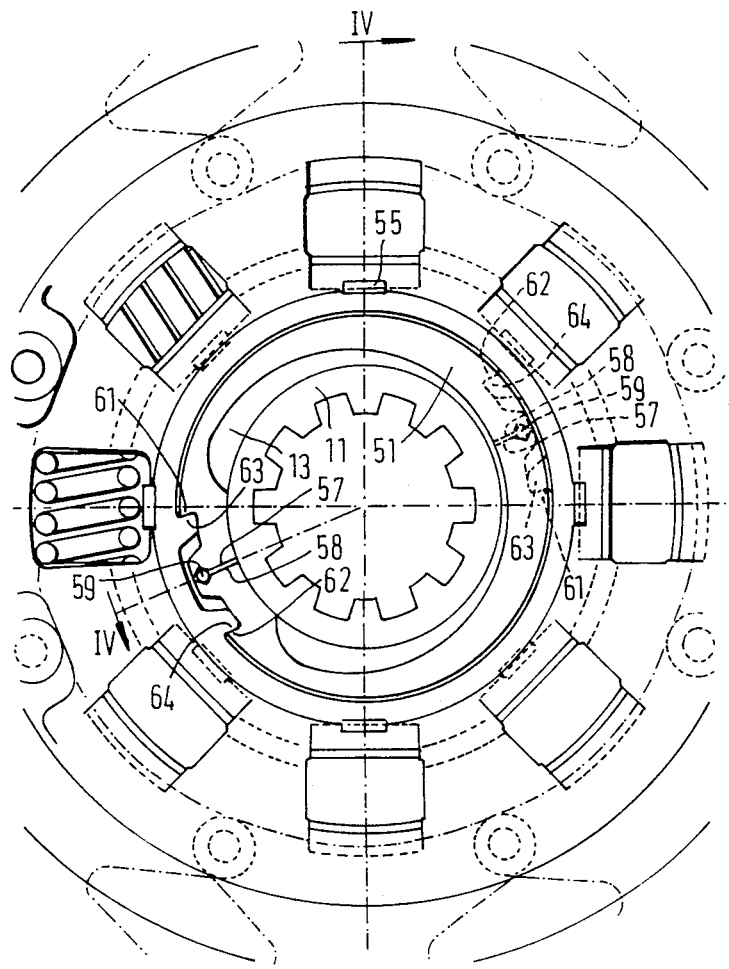
FIG. 3 is a view corresponding to FIG. 1 of an alternative embodiment on a larger scale showing only the central part of the driven plate.

FIGS. 3 and 4 show a second embodiment. In most respects, the driven plate of FIGS. 3 to 4 corresponds to that of FIGS. 1 and 2, the only difference being associated with the auxiliary springing and the friction damping. The description will be restricted to those parts of the second embodiment which differ from the first embodiment.

The auxiliary springing is constituted by two springs 51 and 52, each in the form of an open-ended loop cut from sheet material. As best seen in FIG. 4, spring 51 is constrained between side plate 53 and the flange constituted by the hub flange 13 itself and the inner part of the intermediate drive means 14. An abutment ring 54 surrounds the spring 51, is located by dogs 55 in the spring windows and has a thickness slightly greater that that of spring 51 in order to provide a clearance for the spring between the side plate and hub.

As best seen in FIG. 3, the ends 57 and 58 of the spring act as abutments and bear against a seat constituted by a pin 59 projecting from the flange 13. The end portions of the spring also incorporate hook shaped abutments 61 and 62 which engage with correspondingly shaped seats 63 and 64 respectively on the abutment ring 54.

In similar way, spring 52 is constrained between the hub and a friction thrust washer 65 and is surrounded by an abutment ring 66 dogged to the intermediate drive means. Abutment ring 66 acts as a friction washer in conjunction with the friction thrust washer 65 and a belville spring 67 providing friction loading.

Both springs 51 and 52 lie within the associated abutment ring 54 or 66 with a clearance sufficient to allow expansion of the spring.

The operation of spring 51 will now be described with reference to FIG. 3. During relative angular movement of the hub with respect to the intermediate drive means, seat pin 59 moves circumferentially with respect to the abutments 63 and 64. During clockwise movement of pin 59 about the clutch axis, pin 59 continues to engage against spring end 57 but is moved clear of spring end 58, the spring end portion being held by abutment 62 against seat 64. During this movement, abutment 61 is lifted off seat 63. In this way, the whole length of the spring between abutment 62 and end 57 is loaded in a bending mode and expands circumferentially. When hub 11 and with it pin 59 moves in the opposite direction, the spring is loaded in a similar way between end abutment 58 and abutment 61. Thus, the spring tends to hold the hub in its central rotational position in relation to its range of angular movement with respect to the intermediate drive means.

The width of the spring 51 is greatest at a position opposite the pin 59 because this region of the spring is subjected to the greatest bending moment. The width tapers towards the pin to an extent corresponding to the reduction in bending moment in such a way as to equalize the stresses and so that resilience of the whole length of the spring is used effectively.

Abutments are provided for spring 52 corresponding to those described for spring 51 and spring 52 is also correspondingly tapered. In use, springs 51 and 52 are constrained in axial gaps slightly longer than the thickness of the spring material and this constraint tends to prevent buckling which might otherwise occur with these springs.

A particular advantage of the embodiment of FIGS. 3 and 4 is that the stresses in the springs are always in the same sense, regardless of the direction of relative rotation. This increases the fatigue life compared with a bi-directionally stressed spring. The application of the loads at simple abutments also prevent excessive local bending loads near the ends of the springs, again assisting the fatigue life of the springs.

Thus, in the embodiment of FIGS. 3 and 4, the springs 51 and 52 provide a torsional vibration damper effective between two members constituted by the hub 11 and the intermediate drive means 14.

Several variations on the two embodiments described are possible within the scope of the invention. For example, a wire spring, with suitably bent ends, could be used in place of springs 51 and 52 of FIGS. 3 and 4. Similarly, sheet metal springs, with suitable terminations, could be used in place of the wire springs of FIGS. 1 and 2. Springs 51 and 52 could alternatively be non-metallic springs such as glass fibre reinforced springs. Friction washers such as 66 in FIG. 4 could also be of non-metallic friction material.

It should be noted that in both embodiments the end regions of one spring are diametrically opposite the ends of the other spring. This assists in achieving balance of the driven plate as a whole. Because substantially equal and opposite loads are applied at diametrically opposite positions relative rotation between the two members can be very free, with little tendency for the members to stick together as might occur with unbalanced forces.

We claim:

1. A friction clutch driven plate comprising a hub and a friction facing carrier arranged co-axially with respect to each other; a central annular member comprising part of one of said hub and carrier and windows defined in said central annular member; a pair of further annular members secured together, spaced one to each side of the central member and forming part of the other of said hub and carrier and windows defined in said further annular members generally in register with said windows in the central member; main torsional vibration damping springing drivingly interconnecting the hub and carrier and comprising circumferentially directed compression springs arranged in said windows; a lost motion connection between the carrier and hub associated with said main torsional vibration damping springing; friction damping means effective between said central annular member and said pair of further annular members comprising a first annular friction member operatively arranged between a first member of said pair of further members and said central annular member and a second annular friction member and an axial biassing means operatively arranged between the second of said further annular members and said central member; and auxiliary torsional vibration damping springing operatively arranged in a driving connection between the hub and carrier wherein the auxiliary springing comprises two circumferentially extending spring arms one to each side of the central annular member, each positioned radially inward of one of said annular friction members and arranged to be loaded in bending with relative movement between the hub and the carrier during lost motion connection of the main springing.

2. A friction clutch driven plate comprising a hub; a flange extending radially out from the hub; at least the outer portion of the flange being separate from and capable of limited angular rotation with respect to the hub so as to constitute an intermediate drive means; a friction facing carrier including two side plates, one to each side of the flange; circumferentially acting main torsion damping springing coupling the friction facing carrier to the intermediate drive means; friction damping means effective between the friction facing carrier and the intermediate drive means comprising a first annular friction member operatively arranged between a first of said side plates and the intermediate drive means and a second annular friction member and axial biassing means operatively arranged between the second of said side plates and the intermediate drive means; and auxiliary circumferentially acting torsion damping springing, weaker than the main springing, acting between the hub and the intermediate drive means, wherein the auxiliary springing comprises two circumferentially extending spring arms one to each side of the flange, each positioned radially inward of one of said annular friction members and arranged to be loaded in bending with relative movement between the hub and intermediate drive means.

3. A driven plate according to claim 2 wherein one end portion of each spring arm engages with the hub and the other end portion of each spring arm engages with the intermediate drive means.

4. A drive plate according to claim 2 wherein each end portion of each spring arm has an abutment for the hub and an abutment for the intermediate drive means, arranged so that for rotation in one direction the hub lifts the intermediate drive means abutment off its seat at one end of the spring arm and the intermediate drive means lifts the hub abutment off its seat at the other end of the spring arm.

5. A driven plate according to claim 2 wherein the spring arms are formed of wire.

6. A driven plate according to claim 2 wherein the spring arms are formed from sheet material.

7. A driven plate according to claim 6 wherein the width of each arm varies along its length in dependence on the variation in bending moment along the arm.

8. A driven plate according to claim 6 wherein each spring arm is constrained axially of the driven plate to prevent buckling of the spring arm.

* * * * *